(12) United States Patent
Starfield et al.

(10) Patent No.: US 8,357,905 B2
(45) Date of Patent: *Jan. 22, 2013

(54) METHOD AND APPARATUS FOR RADIATION IMAGING

(75) Inventors: David Mark Starfield, Victory Park (ZA); David Milton Rubin, Lower Houghton (ZA); Tshilidzi Marwala, Douglasdale (ZA)

(73) Assignee: University of Witwaterstrand, Johannesburg (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,123

(22) Filed: Dec. 8, 2010

(65) Prior Publication Data

US 2012/0106699 A1    May 3, 2012

Related U.S. Application Data

(63) Continuation of application No. 12/092,879, filed as application No. PCT/IB2006/003076 on Nov. 2, 2006, now Pat. No. 7,915,590.

(30) Foreign Application Priority Data

Nov. 9, 2005    (ZA) .................................. 2005/09324

(51) Int. Cl.
    *G01N 23/04* (2006.01)
(52) U.S. Cl. ............... 250/363.06; 250/363.02; 378/158
(58) Field of Classification Search ............. 250/363.06, 250/363.02; 378/158
    See application file for complete search history.

(56) References Cited

U.S. PATENT DOCUMENTS

| | | | |
|---|---|---|---|
| 4,506,374 A | 3/1985 | Flynn | |
| 4,885,759 A | 12/1989 | Tomoda et al. | 378/53 |
| 5,627,639 A | 5/1997 | Mende et al. | |
| 5,757,005 A | 5/1998 | Callas et al. | |
| 6,195,412 B1 | 2/2001 | Tobin et al. | |
| 6,452,183 B1 | 9/2002 | Nambu | 250/363.04 |
| 7,476,863 B2 | 1/2009 | Lamadie et al. | |
| 2002/0075990 A1 | 6/2002 | Lanza et al. | |
| 2002/0175289 A1 | 11/2002 | Soluri et al. | |
| 2003/0136916 A1 | 7/2003 | Kearfott et al. | |
| 2005/0263717 A1 | 12/2005 | Soluri et al. | |
| 2006/0027754 A1 | 2/2006 | Ramsden et al. | |
| 2006/0261278 A1 | 11/2006 | Accorsi | |

FOREIGN PATENT DOCUMENTS

| | | |
|---|---|---|
| FR | 2 884 618 | 4/2005 |
| JP | 63-142245 | 6/1988 |
| JP | 2001-153953 | 12/2002 |
| WO | WO 00/54073 | 9/2000 |
| WO | 02/056055 | 7/2002 |
| WO | WO 2004/098260 A2 | 11/2004 |
| WO | WO 2006/111678 A1 | 10/2006 |

OTHER PUBLICATIONS

Australian Government, "Examiner's first report on patent application No. 2006313561," dated Feb. 14, 2011. 2 pages.
O.P. Ivanov et al., "Portable X-ray and gamma-ray imager with coded maks: performance characteristics and methods of image reconstruction", Nuclear Instruments and Methods in Physics Research, Section A 422 (1999) pp. 729-734.

*Primary Examiner* — David Porta
*Assistant Examiner* — Djura Malevic
(74) *Attorney, Agent, or Firm* — Nixon Peabody LLP

(57) ABSTRACT

This invention relates to a method and an apparatus, primarily a radiation imaging apparatus and an array of coded aperture masks, for use in diagnostic nuclear medicine. The coded aperture masks are fitted with radiation attenuation tubes, each of which extends from each side of the mask in the direction of the mask apertures. The tubes are made from lead and have parallel sides. The masks are configured for gamma ray usage and are made from tungsten having a thickness of between 1 and 2 mm.

17 Claims, 5 Drawing Sheets

General imaging geometry

Relationship between geometry and detector intensities

Digital image of the Shepp-Logan phantom

Far-field image acquired using prior art method

Near-field image acquired using prior art method

Near-field image acquired using method and apparatus of the invention

METHOD AND APPARATUS FOR RADIATION IMAGING

FIELD OF INVENTION

The invention relates to a method and apparatus for radiation imaging, more particularly to coded aperture masks for use in diagnostic nuclear medicine and the like.

BACKGROUND TO THE INVENTION

In radiation imaging extensive use has been made of lead collimators. These are essentially grid-like screens typically made of lead configured to have apertures which only permit transmission of parallel or near parallel rays to a detector or imaging means, typically a gamma camera. Lead collimators generally suffer from low resolution and attempts to increase resolution result in lowered efficiency. For this reason, coded aperture masks are being used to replace lead collimators.

Coded aperture masks consist of a pattern of apertures in a material that has a high attenuation coefficient for the type of radiation being imaged. The array of apertures is arranged in a material such as tungsten when used in the imaging of gamma-rays. Typically, the tungsten is 1-2 mm in thickness, with, for example, 88 000 apertures arranged in a pre-determined manner, for imaging gamma-rays from a source such as a human body, as used in diagnostic nuclear medicine.

Coded aperture masks may be used as an alternative to various types of collimators in gamma-ray imaging. The apertures have the potential to increase the signal-to-noise ratio (SNR) of the system [1], and can theoretically be applied advantageously to diagnostic imaging in nuclear medicine. The increased SNR can be manipulated to improve image resolution, to shorten imaging time, or to reduce the patient's dose of radioactivity.

Coded aperture masks have been used extensively in astrophysics, where far-field imaging conditions hold. Such conditions allow for the acquisition of images that are close to perfect for two-dimensional (2D) noise-free data [2]. The near-field conditions of nuclear medicine, however, cause the image to be corrupted by near-field artifacts.

Past research has indicated apertures that are optimal for the purposes of nuclear medicine [3]. Although a reduction of near-field artifacts can be achieved by taking a second image with a rotated aperture, and by then summing the two sets of data according to the method of Accorsi [4], ghosting of the object becomes prominent when imaging over a wide field of view. This approach is further described in WO 20021056055.

Coded aperture imaging requires that for each point of the source, the aperture pattern must be projected onto the detector. This results in overlapping aperture patterns, each shifted and weighted according to the location and the intensity of the specific point source that projected the pattern [5].

Theoretically, this acquisition process is modeled by convolving the source with the aperture pattern. The image is reconstructed by correlating the encoded data with the original coded aperture pattern [5]. This pattern is designed such that a unique reconstruction exists.

Convolution implies that a point source must be imaged equally by each pinhole of the coded aperture, without change in intensity, and with the image of the point source falling directly below the pinhole. The decoding procedure performs correctly under these theoretical conditions, but in practice the convolution model does not hold and near-field artifacts remain a problem.

Whilst attempts at reducing near-field artifacts, such as that described in WO 2002/056055, do show promise, when imaging over a wide field of view the images that are obtained still contain such near-field artifacts.

SUMMARY OF THE INVENTION

In accordance with this invention there is provided radiation imaging apparatus including an array of coded aperture masks, characterized in that a radiation attenuating tube extends about each coded aperture mask in the direction of the axes of the apertures therein.

Further features of the invention provide for each tube to extend from either side of the respective masks; for each tube to have parallel sides; and for the masks to be carded on one sheet of material.

Still further features of the invention provide for the array to be from a 3 by 3 to a 5 by 5 array; for the coded aperture masks to be configured for gamma rays; for the coded aperture masks to be made of tungsten, and tubes to be made of lead; for the tungsten to have a thickness of 1 to 2 mm; for the lead to have a thickness of 1 to 2 mm; and for each tube to extend up to 50 cm, preferably 10 cm, on either side of the array.

The invention also provides a coded aperture mask characterised in that a radiation attenuating tube extends therefrom in the direction of the axes of the apertures.

Further features of the invention provide for the tube to extend from either side of the mask; for the tube to have parallel sides; for the coded aperture mask to be configured for gamma rays; for the coded aperture mask to be made of tungsten, and tube to be made of lead; for the tungsten to have a thickness of 1 to 2 mm; for the lead to have a thickness of 1 to 2 mm; and for the tube to extend up to 50 cm, preferably 10 cm, on either side of the mask.

The invention further provides a method of limiting the field of view of a coded aperture mask which includes inserting a tube of radiation attenuating material between both the mask and a radiation source and the mask and a detector.

Further features of the invention provide for a tube of radiation attenuating material to be inserted between both the mask and a radiation source and the mask and a detector; and for the tubes to extend substantially the intended distance between radiation source and mask and detector and mask respectively.

The invention still further provides a method of reducing artifacts in radiation imaging which includes limiting the field of view of a coded aperture mask.

Further features of the invention provide for the field of view to be limited by decreasing the dimensions of the mask, and by inserting a tube of radiation attenuating material between one or both of a coded aperture mask and a radiation source and the mask and a detector, preferably both; for the radiation to be gamma radiation; for the detector to be a gamma camera; for the radiation source and detector to be less than 50 cm, preferably about 10 cm, from either side of the coded aperture mask; and for the tubes to extend between the source and mask and the detector and mask respectively.

Yet further features of the invention provide for there to be an array of coded aperture masks, each mask having a tube associated therewith.

BRIEF DESCRIPTION OF THE DRAWINGS

The invention will be described, by way of example only, with reference to the drawings in which.

DETAILED DESCRIPTION OF THE DRAWINGS

Figure 3:
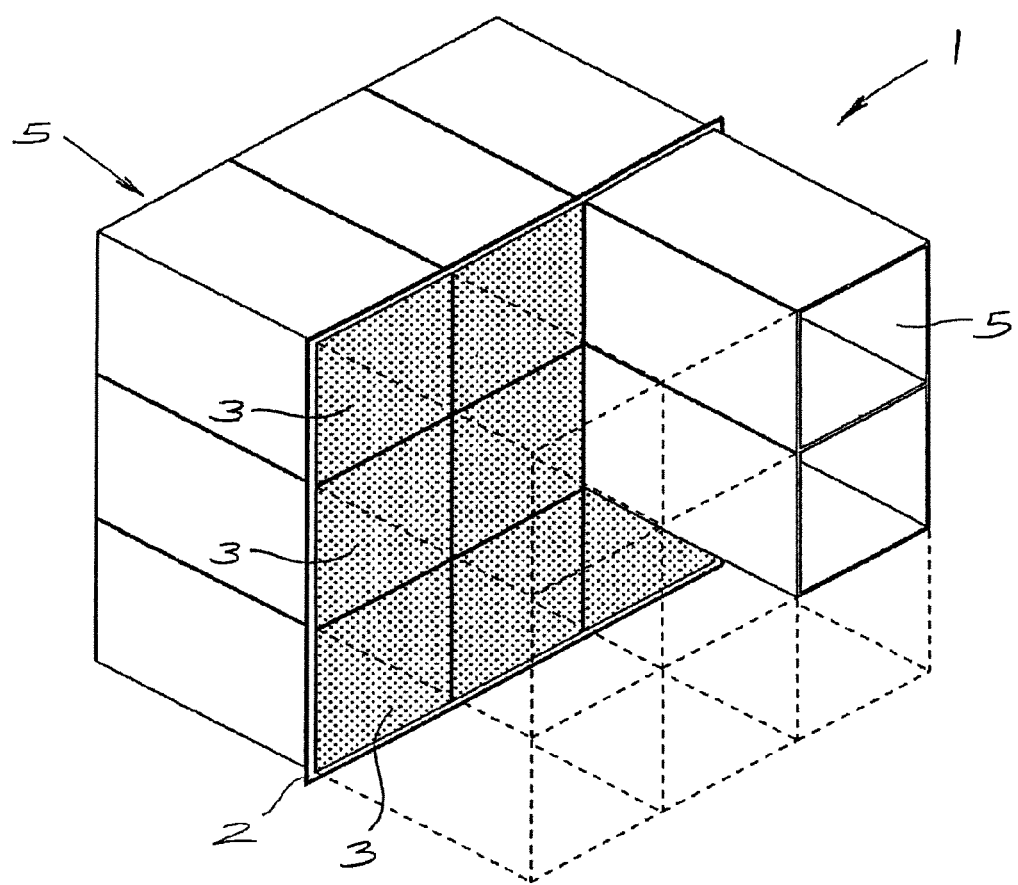
FIG. 3 is a perspective view of one embodiment of radiation imaging apparatus according to the invention.
Figure 4:
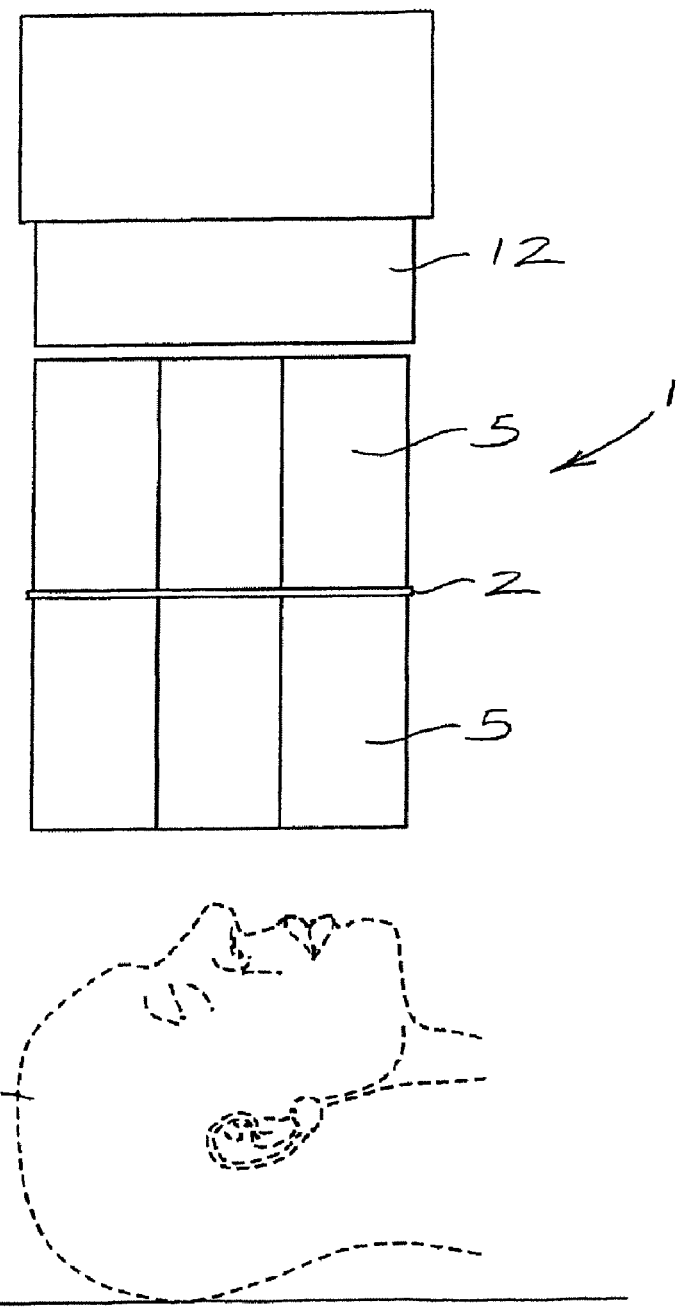
FIG. 4 is a side elevation of the radiation imaging apparatus in FIG. 3 in use.

Radiation imaging apparatus (1) is shown in FIGS. 3 and 4 and includes a square sheet (2) of tungsten which, in this embodiment, is 200 mm by 200 mm and 1 mm thick. A 3 by 3 array of coded aperture masks (3), each 66 mm by 66 mm are provided on the sheet (2) with each coded aperture mask (3) providing a complete coded aperture. A radiation attenuating tube (5) extends about each coded aperture mask (3) from either side of the sheet (2) in the direction of the axes of the apertures, thus normally to the sheet (2).

The tubes (5) have parallel sides and are integrally formed so that adjacent tubes (5) share common sides. In this embodiment the tubes (5) and are made of 1 mm thick lead and extend 10 cm from either side of the sheet (2).

The tubes (5) serve to limit the field of view of each coded aperture mask (3) and, as shown in FIG. 4, the apparatus (1) is used by inserting the sheet (2) between a radiation source (10), in this embodiment a patient's head, and a detector (12), in this embodiment a gamma camera. The tubes (5) extend from the camera (12) at one side of the sheet (2) to the head (10) at the other side thereof. The result is that only the area in the field of view defined by the open end of each tube (5) is projected onto corresponding section of the camera (12).

An entire coded aperture, which multiplexes the image, is provided by each mask (3) and as it is placed within a tube (5) the result is no longer a conventional coded aperture, and is also not a collimator.

It will be understood that each coded aperture mask design is closely related to the pixel size of the gamma camera that is used. For example, a 5 by 5 array of coded aperture masks could be used and these would then be at most 40 mm by 40 mm for the same sheet (2) size. The radiation attenuating tubes can have any suitable length and could be made of lead or any suitable material, as could the sheet (2). Also, although primarily intended for use with gamma radiation, the apparatus and method can be applied to any other suitable form of electromagnetic radiation.

The considerations in arriving at the design of the apparatus were as follows. An examination of the origin of near-field artifacts shows that they arise, inter-alia, from the fact that gamma-rays originating from the same point source have significantly different intensities when arriving at different locations on the detector.

The intensity $I_q$ at a distance $r_q$ away from a point source S with intensity $I_s$ is given by:

$$I_q = \frac{I_s}{4\pi r_q^2} \tag{1}$$

Figure 1:
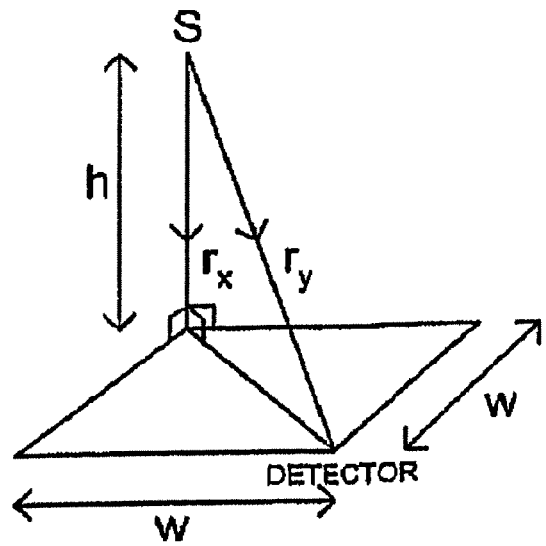
FIG. 1 is a sketch showing general imaging geometry.

Considering the general imaging geometry shown in FIG. 1, for a point source S, at a height h above a square detector of dimension w, the shortest distance between the source and the detector is represented by $r_x$, which is perpendicular to the plane of the detector. The longest possible distance then, is represented by $r_y$. From FIG. 1:

$$r_x = h \tag{2}$$

$$r_y = \sqrt{h^2 + 2w^2} \tag{3}$$

The greatest possible change in $I_q$ on the detector, expressed as a fraction of the maximum $I_q$ is given by:

$$\Delta I = \frac{I_x - I_y}{I_x} \tag{4}$$

Substituting equation (1) into equation (4) gives:

$$\Delta I = \frac{r_y^2 - r_x^2}{r_y^2} \tag{5}$$

It becomes useful to work with the ratio h/w, which is the height h of the source above the detector relative to the detector dimension w. Substituting equation (2) and equation (3) into equation (5), and writing as a percentage, gives $\Delta I$ in its final form:

$$\Delta I = \frac{2}{\left(\frac{h}{w}\right)^2 + 2} \times 100\% \tag{6}$$

Figure 2:
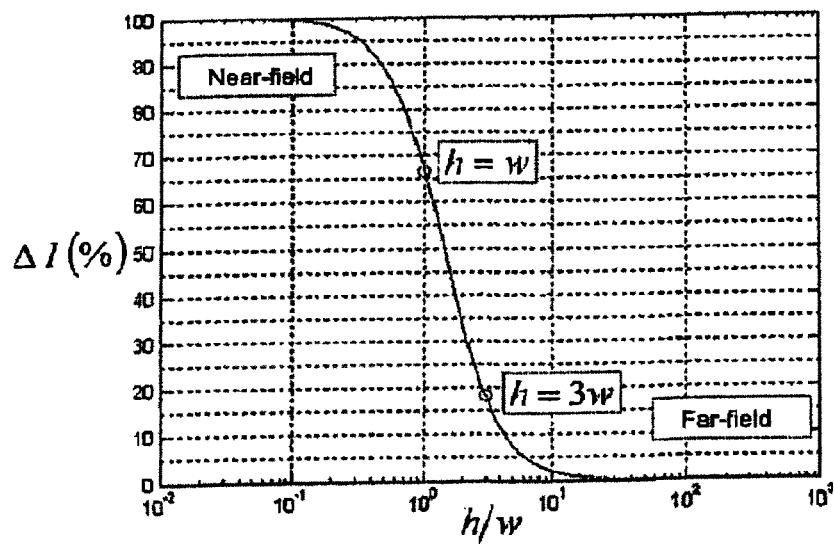
FIG. 2 is a graph showing the relationship between geometry and detector intensities.

With this tool in place, the general case can be applied to particular imaging geometries. FIG. 2 provides a graphical interpretation of equation (6) where the x-axis indicates the field of view (for an object at a constant distance from the detector), while the y-axis is an indication of the degree of near-field artifacts. It shows how the detector intensities change from the near-field case on the left, to the far-field case on the right, where h>>w.

For a perfect reconstruction, the intensities must be identical. This is a requirement of the decoding procedure. However, under near-field conditions, gamma-rays originating from the same point source have significantly different intensities when arriving at different locations on the detector. This is one cause of near-field artifacts.

Now, if coded apertures are to be compared directly with parallel-hole collimators in nuclear medicine, it becomes necessary to image at a 1:1 ratio, however this limitation need not apply for the purposes of imaging. The field of view of the system is then of the same dimensions as the detector.

From FIG. 2 it can be seen that, for a given height above the detector, the change in intensities can be manipulated by decreasing the detector dimension w. Limiting the field of view in turn limits the change in intensities. Near-field artifacts, then, can be traded for a narrower field of view. This is achieved using a radiation attenuating tube around the coded aperture mask between the source and the detector. By placing multiple limited field of view coded aperture masks side by side, in the form of a matrix, the overall field of view of the system remains unaltered. Each limited field of view coded aperture mask will still contain, for example, 12 000 apertures arranged in a pre-determined manner.

Accorsi's technique for the reduction of second order near-field artifacts, which requires rotating the aperture by 90° [4], can still be carried out with ease. Rotating each coded aperture or element of the matrix individually is the same as rotating the whole matrix of coded apertures.

In order to test the apparatus of the invention a computer simulator based on ray tracing techniques, and capable of predicting image acquisition in the field of nuclear medicine, was developed. Computer simulation results for a digital Shepp-Logan phantom [6] are shown in FIG. 5.

Figure 5:
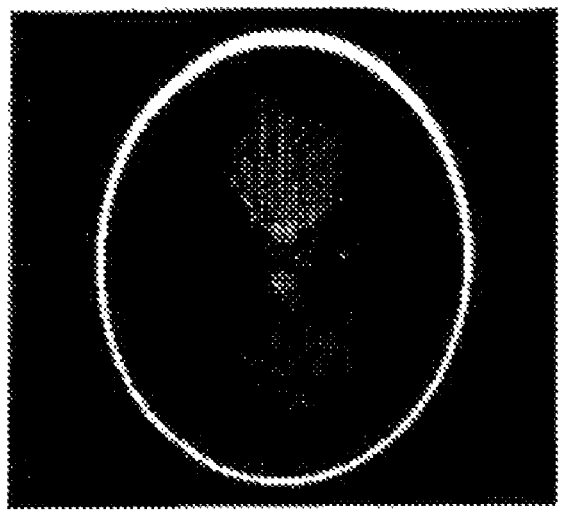
FIG. 5 is an image of the digital Shepp-Logan phantom.

Under ideal conditions the convolution model must hold, and $\Delta I \to 0$ as $h \to \infty$, resulting in a perfect image of the digital Shepp-Logan phantom (FIG. 5). Computing the not mean square error relative to the phantom gives 0. The results are summarised in Table 1.

TABLE 1

Summary of changes in % intensity as a function of the ratio h/w, without limitation

| Situation | Geometry | $\Delta I$ (%) | Root-mean-square error |
|---|---|---|---|
| Ideal | $h \to \infty$ | 0 | 0 |
| Far-field | $h = 5000w$ | $8 \times 10^{-8}$ | 10 |
| Near-field | $h = w$ | 67 | 32 |
| Limited-field of view | $h = 3w$ | 18 | 8 |

Figure 6:
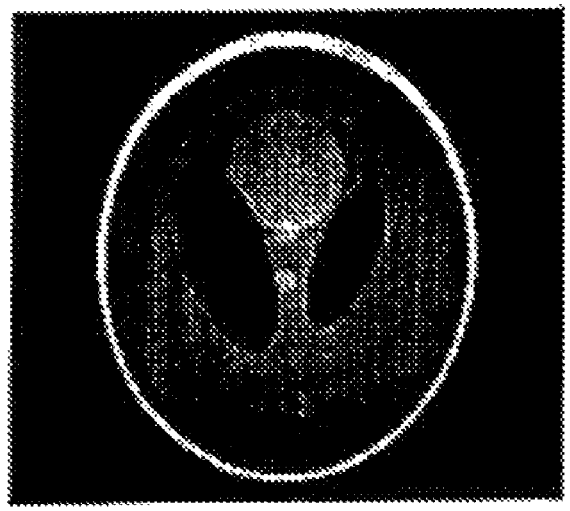
FIG. 6 is a simulated far-field image using prior art methods.

For far-field conditions, putting $h=5000w$, the convolution model gives a negligible change in intensities. The simulated image is presented without correction in FIG. 6. Following a far-field correction [5] the root-mean-square error would be close to 0.

Figure 7:
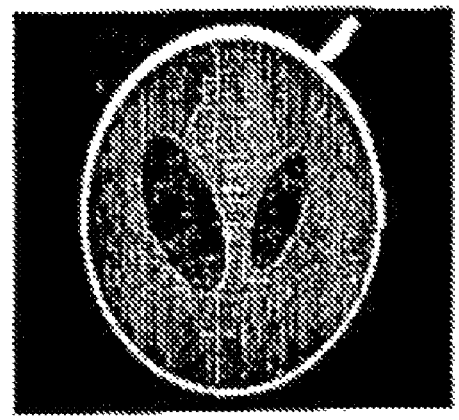
FIG. 7 is a simulated near-field image using prior art methods.

Under near-field conditions, h will be at least equal to w, if not smaller, and $\Delta I$ rises substantially. Accorsi's method for the reduction of second order near-field artifacts [4] was applied and FIG. 7 shows the image acquired with this prior art method.

Figure 8:
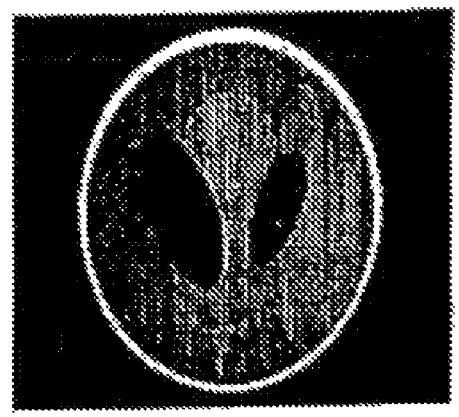
FIG. 8 is a simulated near-field image using the method and apparatus of the invention.

Under the same near-field conditions the coded aperture was replaced with a 3×3 array of limited field of view coded aperture masks as described above such that the overall field of view of the system remained unaltered. Reducing w by ⅓ gives $h=3w$ and pushes $\Delta I$ towards the lower region of the curve. FIG. 8 shows the image acquired using the apparatus and method of the present invention in conjunction with Accorsi's method [4].

The simulation results show that both ideal and far-field imaging geometries adhere to the theory of coded aperture imaging. In accordance with the analysis of the general geometry, there is little or no root-mean-square error with respect to the digital phantom (as illustrated in Table 1).

At the chosen example near-field geometry, the change in intensities rises substantially. This is mirrored by an increased root-mean-square error and by prominent ghosting of the object which occurs even after the application of the existing technique for the reduction of second order near-field artifacts.

For a given height h above the detector, the curve shown in FIG. 2 can be used to judge the appropriate detector dimension w, without limitation, for the limited field of view system. In this example, the analysis suggests that the change in intensities will be reduced to less than ⅓. The enhancement is evident both visually and in terms of the root-mean-square error measurement.

Further with respect to FIG. 2, it will be noted that the curve remains flat at a high level of artifacts, until it drops off rapidly, and flattens out at a very low level of artifacts. This means that it is only meaningful to manipulate the field of view at the precise point where the drop occurs. At the base of the curve, decreasing the field of view further will not improve the result. A similar curve exists for each specific aperture material, aperture thickness, and pinhole width.

The results indicate that the method and apparatus of the invention successfully limit near-field artifacts. Furthermore, ghosting of the object is considerably reduced. The invention thus provides a simple yet highly effective method and apparatus for reducing near-field artifacts in radiation imaging.

REFERENCES

[1] Accorsi, R., Gasparini, F., and Lanza, R. A coded aperture for high-resolution nuclear medicine planar imaging with a conventional Anger camera: experimental results. *IEEE Transactions on Nuclear Science*, 48(6):2411-2417, December 2001.

[2] In't Zand, J. Coded aperture imaging in high-energy astronomy. Laboratory for High Energy Astrophysics (LHEA), http://lheawww.gsfc.nasa.gov/docs/cal/coded_intr.html, 1996. Last date of access: 30 Mar. 2004.

[3] Accorsi, R., Gasparini, F., and Lanza, R. Optimal coded aperture patterns for improved SNR in nuclear medicine imaging. *Nuclear instruments and Methods in Physics Research*, A474:273-284, 2001.

[4] Accorsi, R., and Lanza, R. Near-field artifact reduction in planar coded aperture imaging. *Journal of Applied Optics*, 40(26):4697-4705, 2001.

[5] Accorsi, R. Design of near-field coded aperture cameras for high-resolution medical and Industrial gamma-ray imaging. PhD Thesis, Massachusetts Institute of Technology, June 2001.

[6] Shepp, L. A., and Logan, B. F. The Fourier reconstruction of a head section. *IEEE Transactions on Nuclear Science*, NS-21(3):21-43, June 1974.

What is claimed is:

1. A radiation imaging apparatus comprising:
   a composite coded aperture including an array of repeated coded aperture masks,
   wherein each coded aperture mask of the array includes a complete pattern of apertures, and each coded aperture mask includes a radiation attenuating tube extending from each coded aperture mask in the direction of the axes of the apertures therein.

2. The radiation imaging apparatus as claimed in claim 1, wherein each radiation attenuating tube has parallel sides.

3. The radiation imaging apparatus as claimed in claim 1, wherein the masks are carried on one sheet of material.

4. The radiation imaging apparatus as claimed in claim 1, wherein the array of repeated coded aperture masks is from an identical 3 by 3 array to an identical 5 by 5 array.

5. The radiation imaging apparatus as claimed in claim 1, wherein the coded aperture masks are configured for use with gamma rays.

6. The radiation imaging apparatus as claimed in claim 1, wherein the coded aperture masks are made of tungsten and the radiation attenuating tubes are made of lead.

7. The radiation imaging apparatus as claimed in claim 6, wherein the tungsten has a thickness of 1 to 2 mm, and the lead has a thickness of 1 to 2 mm.

8. A composite coded aperture mask comprising:
an array of repeated coded aperture masks, wherein each aperture mask of the array includes a complete pattern of apertures, and each coded aperture mask includes a radiation attenuating tube extending from each repeated coded aperture mask in the direction of the axes of the apertures.

9. The coded aperture mask as claimed in claim 8, wherein the radiation attenuating tube has parallel sides.

10. The coded aperture mask as claimed in claim 8, wherein the coded aperture mask is configured for use with gamma rays.

11. The coded aperture mask as claimed in claim 8, wherein the coded aperture mask is made of tungsten and each tube is made of lead.

12. The coded aperture mask as claimed in claim 11, wherein the tungsten has a thickness of 1 to 2 mm, and the lead has a thickness of 1 to 2 mm.

13. A method of limiting the field of view of a composite coded aperture mask comprising:
inserting an array of repeated coded aperture masks, wherein each coded aperture mask of the array includes a complete pattern of apertures, and each coded aperture mask includes a tube of radiation attenuating material between at least one of the array of repeated coded aperture masks and a radiation source and the array of repeated coded aperture masks and a detector.

14. A method of reducing artifacts in radiation imaging comprising:
collecting radiation energy from a radiation source by a composite coded aperture; and
limiting the field of view of the composite coded aperture mask, wherein the composite coded aperture mask includes an array of repeated coded aperture masks, wherein each coded aperture mask of the array includes a radiation attenuating tube extending from each coded aperture mask in the direction of the axes of the apertures therein.

15. The method as claimed in claim 14, wherein the field of view is limited by inserting a tube of radiation attenuating material between at least one of the coded aperture mask and a radiation source and the coded aperture mask and a detector.

16. The method as claimed in claim 14, wherein the radiation is gamma radiation.

17. The method as claimed in claim 15, wherein the detector is a gamma camera.

* * * * *

UNITED STATES PATENT AND TRADEMARK OFFICE
CERTIFICATE OF CORRECTION

PATENT NO. : 8,357,905 B2
APPLICATION NO. : 12/963123
DATED : January 22, 2013
INVENTOR(S) : Starfield et al.

Page 1 of 1

It is certified that error appears in the above-identified patent and that said Letters Patent is hereby corrected as shown below:

On the Title Page, Item [73]:
Please delete "University of Witwaterstrand" and insert
-- University of Witwatersrand, Johannesburg --, therefor.

Signed and Sealed this
Twenty-third Day of July, 2013

Teresa Stanek Rea
*Acting Director of the United States Patent and Trademark Office*